United States Patent
Dhawan et al.

(10) Patent No.: US 8,620,029 B2
(45) Date of Patent: *Dec. 31, 2013

(54) SYSTEMS AND METHODS OF TRACKING OBJECTS IN VIDEO

(75) Inventors: Anuj Dhawan, Noida (IN); Abhinav Darbari, Noida (IN); Ramesh P. B., Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,870

(22) Filed: Jul. 23, 2012

(65) Prior Publication Data

US 2012/0288155 A1 Nov. 15, 2012

Related U.S. Application Data

(63) Continuation of application No. 12/542,120, filed on Aug. 17, 2009, now Pat. No. 8,249,299.

(51) Int. Cl.
*G06K 9/00* (2006.01)
*H04N 5/225* (2006.01)

(52) U.S. Cl.
USPC .................... 382/103; 382/291; 348/169

(58) Field of Classification Search
USPC ......... 382/100, 103, 106–107, 115–118, 155, 382/162, 168, 173, 181, 190–195, 219, 224, 382/232, 254, 274, 276, 291, 305, 312; 375/240.12; 352/57; 348/169, 135

See application file for complete search history.

(56) References Cited

U.S. PATENT DOCUMENTS

| | | | | |
|---|---|---|---|---|
| 4,925,294 A * | 5/1990 | Geshwind et al. | ............... | 352/57 |
| 6,133,946 A * | 10/2000 | Cavallaro et al. | ............. | 348/135 |
| 6,441,846 B1 * | 8/2002 | Carlbom et al. | ............. | 348/169 |
| 7,856,055 B2 * | 12/2010 | Zhou et al. | ............... | 375/240.12 |
| 8,121,347 B2 * | 2/2012 | Metaxas et al. | ............... | 382/103 |
| 2007/0031003 A1 * | 2/2007 | Cremers | ....................... | 382/103 |

OTHER PUBLICATIONS

Notice of Allowance in Related U.S. Appl. No. 12/542,120 dated Apr. 9, 2012, 11 pages.

* cited by examiner

*Primary Examiner* — Seyed Azarian
(74) *Attorney, Agent, or Firm* — Kilpatrick Townsend & Stockton LLP (57) ABSTRACT

Systems and methods for identifying, tracking, and using objects in a video or similar electronic content, including methods for tracking one or more moving objects in a video. This can involve tracking one or more feature points within a video scene and separating those feature points into multiple layers based on motion paths. Each such motion layer can be further divided into different clusters, for example, based on distances between points. These clusters can then be used as an estimate to define the boundaries of the objects in video. Objects can also be compared with one another in cases in which identified objects should be combined and considered a single object. For example, if two objects in the first two frames have significantly overlapping areas, they may be considered the same object. Objects in each frame can further be compared to determine the life of the objects across the frames.

16 Claims, 5 Drawing Sheets

SYSTEMS AND METHODS OF TRACKING OBJECTS IN VIDEO

CROSS-REFERENCE TO RELATED APPLICATION

This application is a continuation application of U.S. patent application Ser. No. 12/542,120 filed on Aug. 17, 2009, now U.S. Pat. No. 8,249,299, the contents of which are incorporated herein by reference in their entirety.

FIELD

This disclosure generally relates to computer software that runs, displays, provides, or otherwise uses video, digital animation, and other types of electronic content.

BACKGROUND

Various types of video and electronic content present content that changes over time. Video, for example, typically consists of a series of frames that are played or otherwise displayed one after another. People, animals, automobiles, buildings, background, and other objects can appear on multiple frames of a video. For example, a person may appear to walk along a street from one side of a video to the other over the course of the video. More specifically, in the first frame of the video, the person may appear in a position at the far left of the displayed content, in the next frame the person may appear slightly to the right of its position in the prior frame, etc. Generally, the person may appear different in the various frames of the video. For example, as the person walks, the person's arms may swing back and forth and the person's body orientation may change.

For various reasons, tracking objects such as people, in recorded video and other electronic content presents various challenges. For example, it can be difficult to accurately identify an object in multiple frames of a video because the object may not be appear entirely the same and may appear in different positions in the various frames, as previously mentioned. Similarly, it can be difficult to determine the boundaries of an object. Generally, improved techniques for identifying, tracking, and using objects in videos and similar electronic content are needed.

SUMMARY

Systems and methods are disclosed for identifying, tracking, and using objects in a video, digital animation, or similar electronic content. One exemplary embodiment comprises identifying feature points corresponding motion paths within a video. The exemplary method further involves using the motion paths to group feature points and using feature point location information to identify sub-groups. Object representations associated with the sub-groups can then be presented with the video on a display of a computer apparatus.

Another exemplary embodiment comprises similarly identifying feature points, motion paths, groups, and sub-groups, and further comprises segmenting out a well-defined object, where boundaries for the well-defined object more closely correspond to the boundaries of an actual video object, for example, than a simple rectangle defined by the outermost feature points of a sub-group of feature points corresponding to the actual video object.

An object representation such as a rectangle or well-defined object can be displayed with a video for a variety of purposes and provide a variety of benefits. In the context of editing video, such representations can be used, for example, to apply effects and/or define motion paths for newly added objects, among other things.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for identifying, tracking, and using objects in a video, digital animation, or similar electronic content, collectively referred to herein as simply video. One embodiment provides an automatic method to track multiple moving objects. This can involve tracking one or more feature points within a video scene and separating those feature points into multiple layers based on motion paths. Each such motion layer can be further divided into different clusters, for example, based on distances between points. These clusters can then be used as an estimate to define the boundaries of the objects in the video. Objects can also be compared with one another in cases in which identified objects should be combined and considered a single object. For example, if two objects in the first two frames have significantly overlapping areas, they may be considered the same object. Objects in each frame can further be compared to determine the life of the objects across the frames.

These illustrative examples are given to introduce the reader to the general subject matter discussed herein and are not intended to limit the scope of the disclosed concepts. The following sections describe various additional embodiments and examples.

Illustrative Computing Environment

Figure 1:
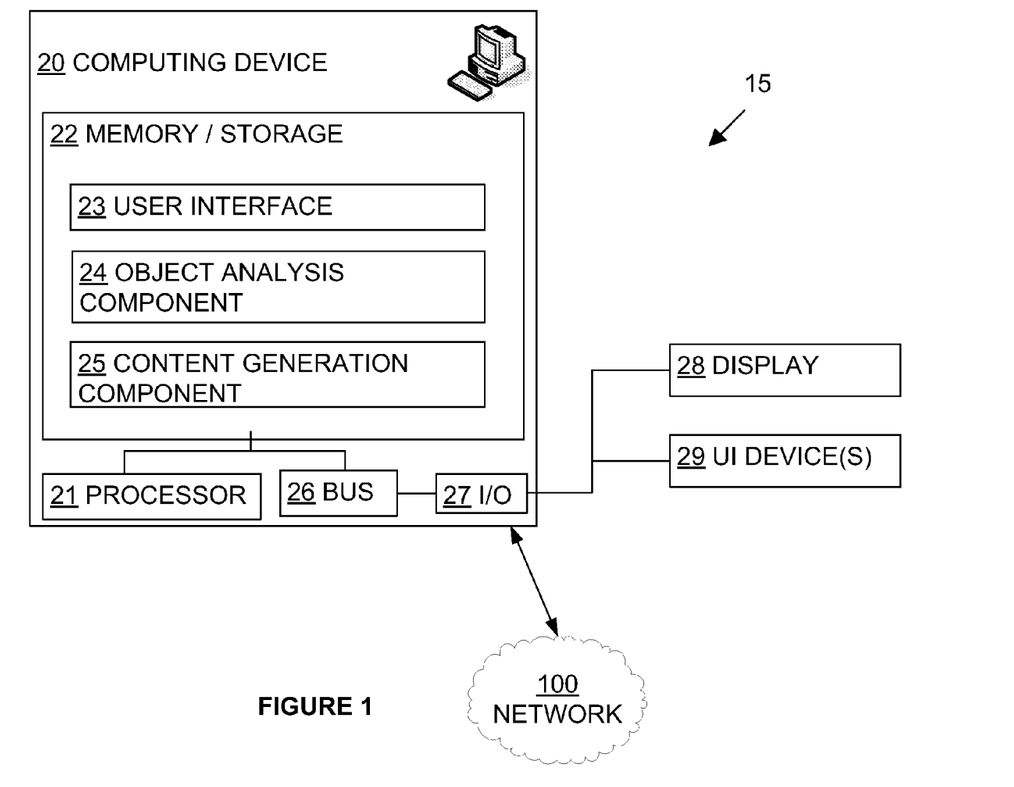
FIG. 1 is a system diagram illustrating an illustrative computing environment.

Referring now to the drawings in which like numerals indicate like elements throughout the several Figures, FIG. 1 is a system diagram illustrating an illustrative computing environment 5 according to certain embodiments. Other embodiments may be utilized. The computing environment 5 comprises a computing device 10 that is connected to a wired or wireless network 100. Exemplary applications that execute on the computing device 10 are shown as functional or storage components residing in memory 12. The memory 12 may be transient or persistent. As is known to one of skill in the art, such applications may be resident in any suitable computer-readable medium and execute on any suitable processor. For example, the computing device 10 may comprise a computer-readable medium such as a random access memory (RAM) coupled to a processor 11 that executes computer-executable program instructions and/or accesses information stored in memory 12. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The computing device 10 may also comprise a number of external or internal devices such as a mouse, a CD-ROM, DVD, a keyboard, a display, audio speakers, or other input or output devices. For example, the computing device 10 includes input/output connections 17, connecting a display 18 and various user interface devices 19. The computer device 10, depicted as a single computer system, may be implemented as a network of computers, servers, or processors. Examples of a server device are servers, mainframe computers, networked computers, a processor-based device, and similar types of systems and devices.

A computing device, such as exemplary computing device 10, can utilize various functional components to implement one or more of the features described herein. Computing device 10 has a user interface 13 for receiving (and possibly displaying) videos and other electronic content. Computing device 10 may further have an object analysis component 14 for identifying, tracking, and using objects in video and similar electronic content. The object analysis component 14 may, as examples, track and separate feature points into multiple layers based on the motion paths of those feature points. The feature points in a given layer or in a sub-group of feature points on a layer (e.g., identified based on clustering) can be identified by the object analysis component 14 as an object. The object analysis component 14 may use these layers or clusters within a layer to define boundaries of the objects and present a representation, such as a rectangle, to display the object within one or more of the video frames. The user interface 13 may allow a user to interact with such a representation, for example, to adjust the representation's size or shape and/or to add video effects or additional objects that will be associated with the identified object. For example, the user interface 13 may receive input creating a new object that will be displayed on or with the video and that will move based on the movement of an identified object.

In circumstances in which content is generated comprising edited videos, computing device 10 may further have a content generation component 15 that provides the video and/or other combined content objects, for example, by providing such content in a computer readable medium defining the content. The content can be provided, for example, for display on computing device 10 and/or other electronic devices. Accordingly, one aspect of certain embodiments is facilitating the creation of electronic content that includes video that is combined with other objects or effects in a video editing environment.

This illustrative computing environment 5 is provided merely to illustrate a potential environment that can be used to implement certain embodiments. Other computing devices and configurations may alternatively or additionally be utilized.

Exemplary Methods of Identifying, Tracking, and Using Objects in Video

Figure 2:
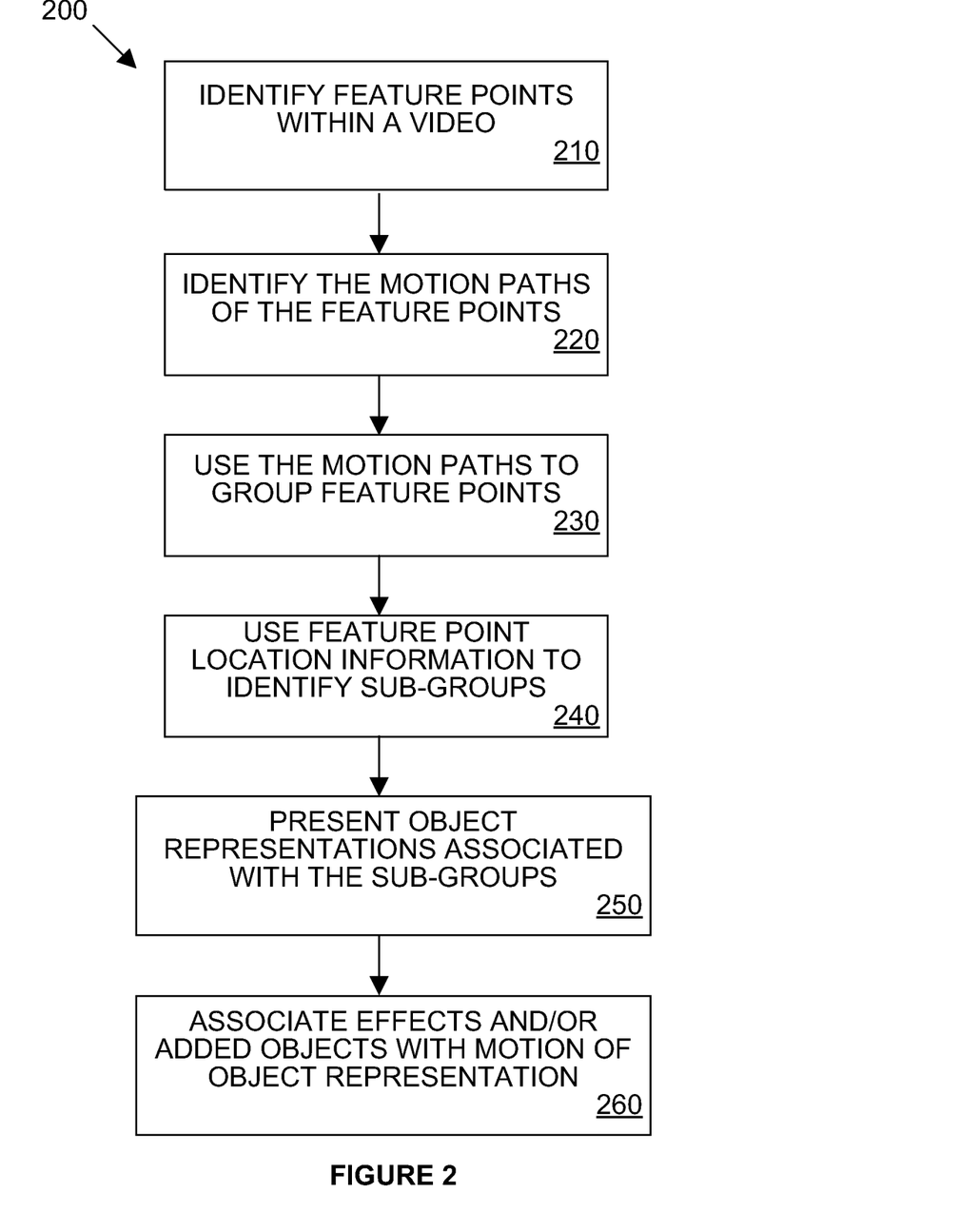
FIG. 2 is a flow chart illustrating an exemplary method of identifying, tracking, and using video objects.

Systems and methods are disclosed for identifying, tracking, and using objects in a video or similar electronic content. FIG. 2 is a flow chart illustrating an exemplary method 200 of identifying, tracking, and using video objects. The exemplary method 200 comprises identifying feature points within a video, as shown in block 210. Feature points can be selected in a variety of ways. For example, feature points can be selected by identifying a selection of points within the frames of the video where the point can be identified as the same point in multiple frames of the video.

The exemplary method 200 further comprises identifying the motion paths of the feature points, as shown in block 220. This can involve tracking one or more feature points within a video scene to identify the path that each feature point takes over the course of some or all of the scene. Feature points may be points which have a high trackability score and can be found using various existing algorithms including, but not limited to, the Kanade-Lucas-Tomasi (KLT) feature tracker, the scale-invariant feature transform (SIFt), and the like. A motion path may be a collection of positions that represent the path of such a feature point. Alternatively, a motion path may be represented by an equation or other information that also represents the path of such a feature point. As yet another alternative, feature point motion paths may be tracked by a different technique or combination of techniques.

The exemplary method 200 further comprises using the motion paths to group feature points, as shown in block 230. For example, this may involve grouping feature points into different "layers" based on the motion paths of the points. Feature points having similar motion paths could be grouped in a single layer. Similarly, in the case of motion paths defined by collections of positions, the individual positions along the path of multiple feature points could be compared to identify feature points having similar paths. Additional and/or alternative techniques may also be employed to use the motion path information to group feature points. As examples, color information and/or pixel proximity may be used.

Figure 3A:
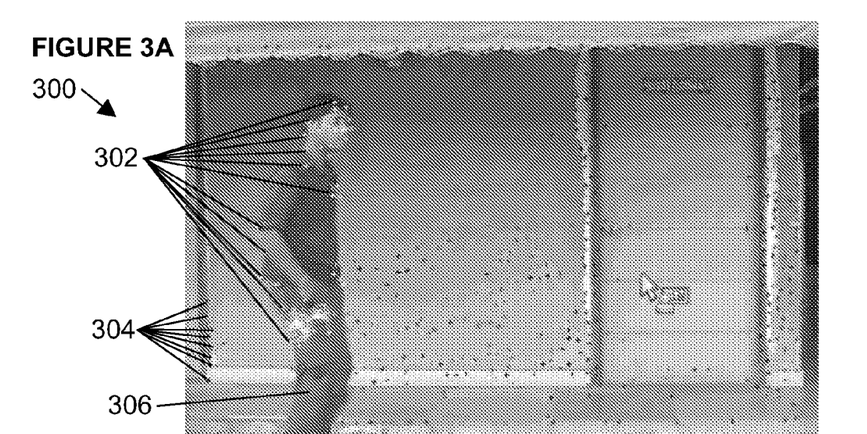
FIGS. 3A-C are image captures of portions of computer screens showing various tracking aspects of certain embodiments using an exemplary video.
Figure 3B:
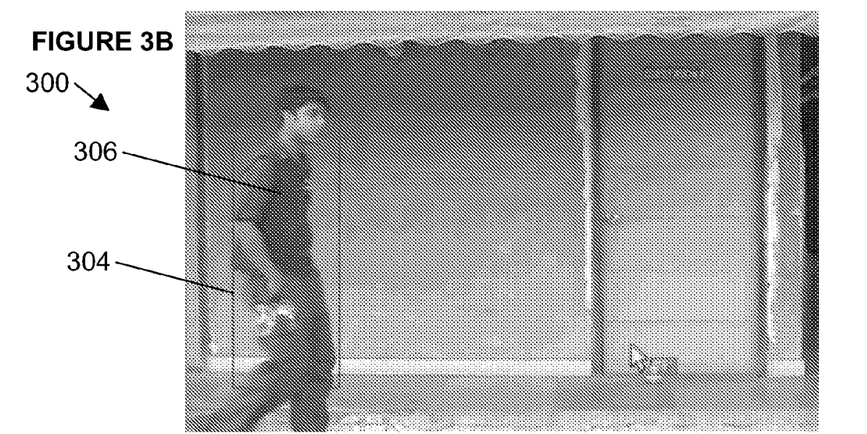
Figure 3C:
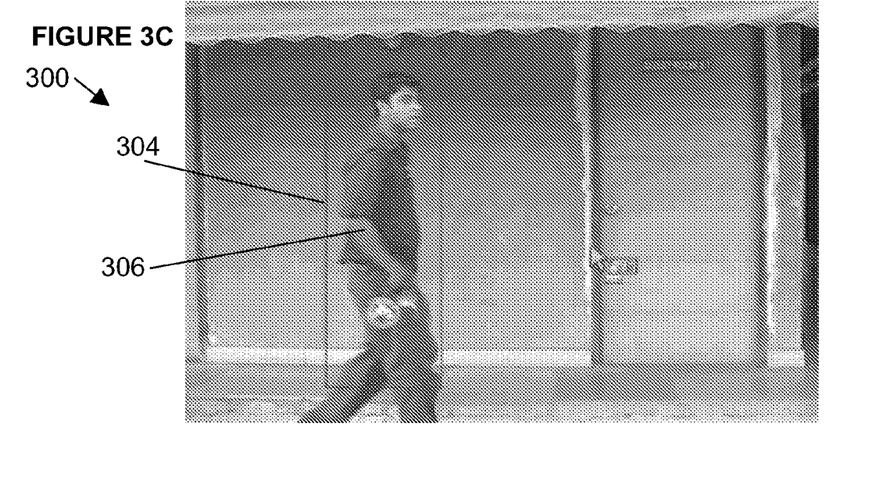

FIGS. 3A-C are image captures of portions of computer screens showing various tracking aspects of certain embodiments using an exemplary video 300 of person 306 walking. In FIG. 3A, dots representing various feature points are displayed on a frame of a video. These feature points have been grouped based on their motion paths. For example, exemplary feature points 302 (and other dots not identified) are all associated with similar motion paths and are therefore considered to be on a first layer, while exemplary feature points 304 are all associated with motion paths that are similar to one another but different from the motion paths of the feature points of the first layer. Accordingly, these exemplary feature points 304 (and other dots not identified) are considered to be on a second layer different from the first layer.

Returning to FIG. 2, the exemplary method 200 further comprises using feature point location information to identify sub-groups, as shown in block 240. For example, in the case of motion layers, the feature points of one or more of the motion layers can be further divided into different clusters. A motion layer, for example, can be divided into multiple clusters based on the distances between points. As a specific example, feature points close to one another (e.g., within a minimum distance of at least one other point) in the first frame of the video may be grouped as a single cluster. As another example, feature points whose average distance between one another in multiple frames is small can be grouped as a single cluster.

Method 200 elements 210, 220, 230, and 240 can involve identifying objects in each frame. In such cases, the method can then identify where an object occurs in multiple frames, including in a series of sequential frames. Accordingly, the method 200 may involve, for example, comparing objects in one frame with objects in previous and/or later frames to identify where the same objects occurs across multiple frame. In one embodiment, the occurrence of the same object in multiple frames is identified based on the presence of one or more same feature points or sub-groups of feature points in the different frames.

The exemplary method 200 further comprises presenting object representations associated with the sub-groups, as shown in block 250. For example, a cluster of feature points may generally relate to a person who is shown moving in the video. A rectangle generally surrounding the person may be displayed to show that that person has been identified as an object of the video. Such a representation can be presented in a variety of ways. Generally, clusters or other sub-groups can be used as an estimate to define the boundaries of the objects in a video. Such objects can also be compared with one another to identify circumstances in which identified objects should be combined and considered a single object. For example, if two objects in the first two frames have significantly overlapping areas, they may be considered the same object.

Objects that are not of interest for a particular purpose can be excluded. For example, background objects can be identified as objects or groups that span almost the entire or a large percentage of the frame width or height and can be excluded. Similarly, very small objects can also be ignored as errors. The resultant objects that are of interest can be tracked across frames, for example, by displaying representations of those objects on the frames.

FIGS. 3B-C illustrate a rectangle 304 that is provided as a representation of the person 306 displayed in the video. Each of FIGS. 3B and 3C illustrate a different frame of the video. Thus, as the person appears in different locations in different frames, the rectangle 304 changes its position to reflect the different positions of the person. The size and position of the rectangle and/or whether the rectangle appears at all can be based at least in part on the position of feature points that are associated with the rectangle.

A representation of a tracked object, such as the rectangle 304, can be used in a variety of contexts in which video is played, edited, displayed, or otherwise used. In the context of editing a video, a displayed representation of an object can be presented in a variety of ways and may provide a variety of specific benefits.

Figure 4A:
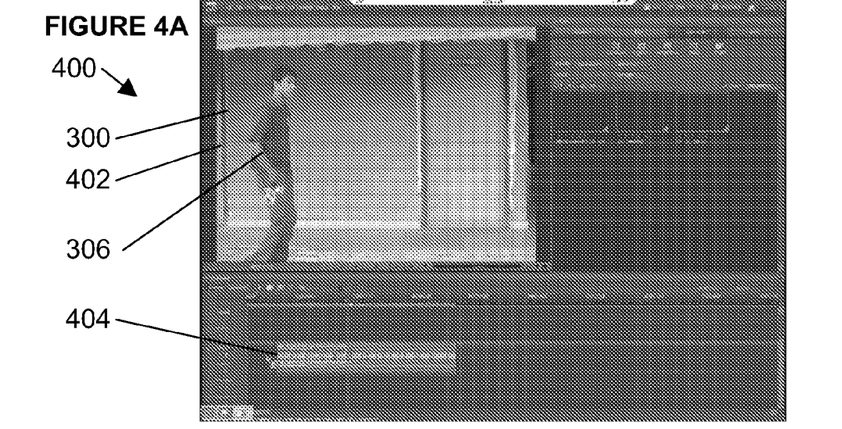
FIGS. 4A-C are image captures of portions of computer screens showing a video editing environment editing the exemplary video of FIGS. 3A-C.
Figure 4B:
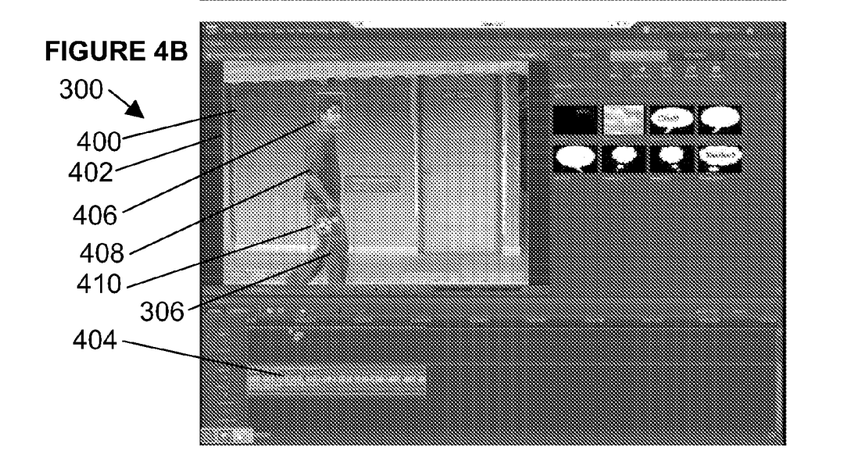
Figure 4C:
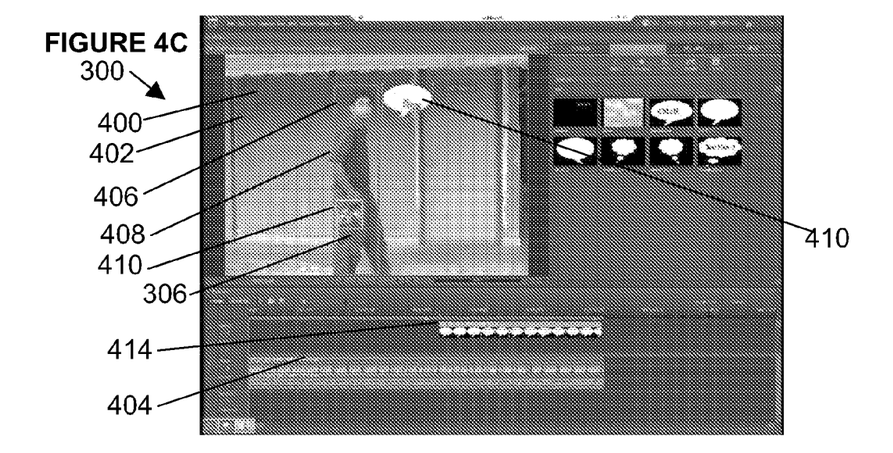

FIGS. 4A-C are image captures of portions of computer screens showing a video editing environment 400 editing the exemplary video 300 of FIGS. 3A-C. In FIG. 4A, a user has loaded the video 300 into the video editing environment 400 and views a frame of the video 300 displayed in viewing portion 402. A timeline 404 is also displayed in the video editing environment 400 allowing the user to select and work with the different frames of the video 300. Different editing environments may also be used offering differing user interface and other features.

FIG. 4B illustrates object representation 406, 408, 410 displayed for different objects that have been identified within the video, for example, using the techniques described with respect to method 200. In this example, object representation 406 corresponds to the head of the person 300, object representation 408 corresponds to the entire displayed portion of the person 306, and object representation 410 corresponds to an object near the pocket of the leg of the person 306. In the case of object representations corresponding to feature point groups and/or clusters, the object representations 406, 408, 410 are assumed to represent an object. In other words, feature points having similar motion paths and located in a same general location within a video are assumed to correspond to an object (e.g., a person, car, animal, etc.). The video editing environment 400 may present object representations as suggestions for the user to modify, edit, or otherwise use.

FIG. 4C illustrates the adding of a new object 410 to the video using the video editing environment 400. The new object 410 can be added for example by positioning an object on the viewing portion 402, which in this case displays a single frame of the video. The new object 410 can then be associated with one of the object representations, such as object representation 406. In this specific example, the new object 410 is a dialog bubble that is associated with the object representation 406 corresponding to the head of the person 300. This association can be used to allow the new object 410 to move according to the movement of the associated object. For example, the new object 410 displayed as a dialog box can be associated with the object representation 406 corresponding to the head of the person 300 such that the relative position of new object 410 with respect to the object representation 406, such that the dialog appears to move along with the head as the video is played.

Returning to FIG. 2, the method 200, after presenting object representations in block 250, can associate effects and/or add objects whose movement is associated with the motion of an object representation, as shown in block 260. An association between an added or edited object and an object representing something in the video can be created in a variety of ways and used for a variety of benefits. In FIG. 4C, the timeline 404 of the video is used in conjunction with a timeline 414 associated with the new object 410. These timelines 404, 412 are displayed so that the user is able to easily see during which portions of the video the new object 410 is used. In some circumstances, the video editing environment 400 may further allow a user to interact with the timelines 410 on a same or related time scale to allow the user to easily adjust how objects are displayed during different time segments of a video.

Object representations such as object representations 406, 408, and 410 may also be used edit a video in other ways. For example, effects may be used on one or more of the object representations to create any number of desired results. As one specific example, a particular object (defined by its object representation) may be enlarged, twisted, highlighted, color-modified, or hidden, as examples.

Figure 5:
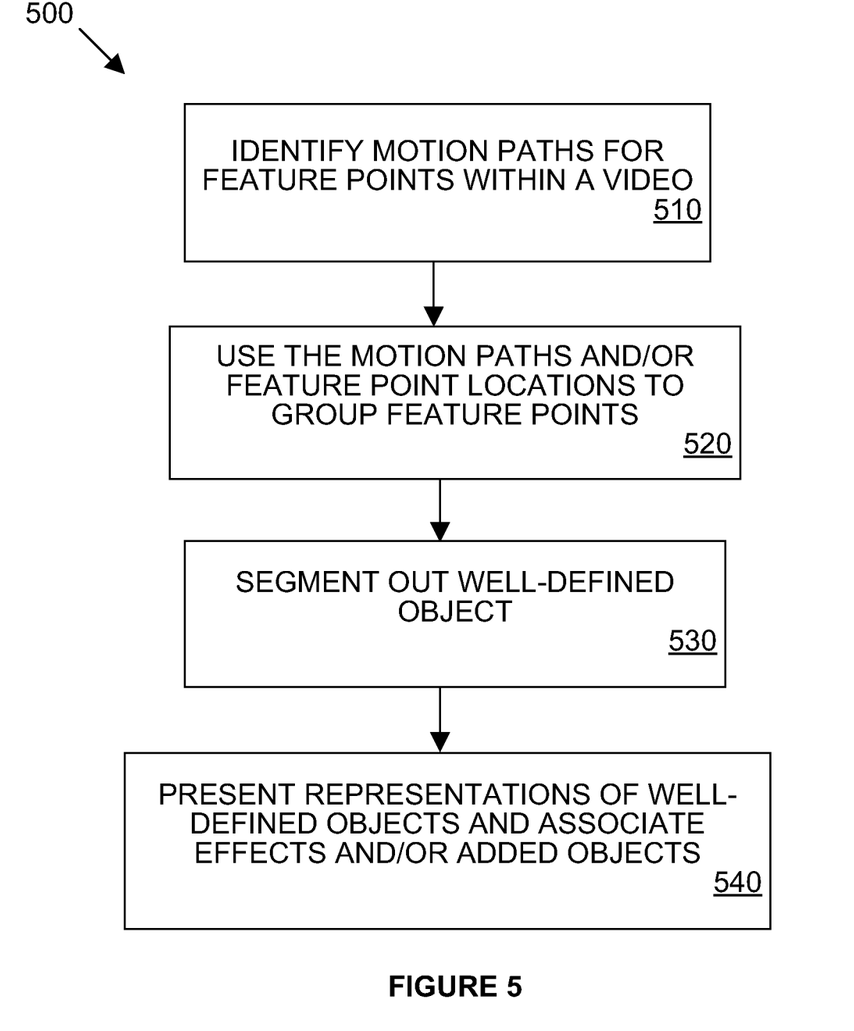
FIG. 5 is a flow chart illustrating an exemplary method of segmenting out multiple moving portions of a video.

FIG. 5 is a flow chart illustrating an exemplary method 500 of segmenting out multiple moving portions of a video. The exemplary method 500 comprises identifying motion paths for feature points within a video, as shown in block 510. This can involve tracking one or more feature points within a video scene to identify the path that each feature point takes over the course of some or all of the scene.

The exemplary method 500 further comprises using the motion paths and/or feature point locations to group feature points, as shown in block 520. For example, this may involve grouping feature points into different motion "layers" based on the motion paths of the points. The feature points of one or more of the motion layers can be further divided into different clusters. A motion layer, for example, can be divided into multiple clusters based on the distances between points.

The method 500 can further involve obtaining or otherwise receiving input for a segmentation algorithm by drawing a region around one or more of the feature points that are associated with a group or subgroup and applying an erosion filter. Additional and/or alternative techniques may also be used.

The exemplary method 500 further comprises segmenting out well-defined objects, as shown in block 530. Boundaries for such a well-defined object more closely correspond to the boundaries of the actual object. As a specific example, an outline generally-corresponding to the shape of a person may better correspond to the person than a simple rectangle displayed around the person.

Segmenting out well-defined objects may be performed in various ways. For example, it may involve using the feature points of each cluster in an image segmentation algorithm that is applied on the original frame. It may involve receiving user input on one or more frames such as the first frame and using that user input to extrapolate boundaries that should be applied for the same object in later frames. Segmenting out well-defined objects may involve identifying a two dimensional area (such as for example, a Gaussian) around each feature point that then replace the points with a continuous marked region. An erosion filter can also be applied so that the marked region is completely inside the object to be extracted. In this way, input for an image segmentation algorithm can automatically be generated for each frame, with limited or no user input. An image segmentation or another algorithm can use the generated information to provide the segmented out objects.

The exemplary method 500 may further comprise presenting representations of the well-defined objects and associating effects and/or added objects with those representations as shown in block 540. An association between an object and an object representing something in the video can be created in a variety of ways and used for a variety of benefits as described previously. In the circumstance of a video editing environment, for example, one provided through the user interface 23 of the exemplary computing environment 15 of FIG. 1, a user may be able to interact with a video display canvas, timelines, editing menus and tools, and other features to adjust how objects move and are otherwise displayed during different time segments of a video.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, cameras, camcorders, mobile devices, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A computer-implemented method comprising:
   identifying feature points and corresponding motion paths of the feature points within a video;
   using the motion paths to group at least some of the feature points into groups,
   using feature point location information to identify sub-groups of the feature points of one or more of the groups; and
   providing the video and object representations associated with the sub-groups for display on a computer apparatus, the computer apparatus comprising instructions embodied in a computer-readable medium which configure the computer apparatus to display the video and object representations.

2. The method of claim 1:
   wherein using the motion paths to group feature points comprises grouping feature points into different layers, wherein feature points having similar motion paths are grouped together; and
   wherein using the feature point location information to identify sub-groups comprises dividing motion layers into clusters based on distances between feature points.

3. The method of claim 2 wherein the object representation is a rectangle defined by the outermost feature points in a cluster.

4. The method of claim 1 wherein at least one motion path is a collection of positions or is estimated by an equation.

5. The method of claim 1 wherein displaying the video and object representations comprises presenting an object representation in different positions within multiple frames of the video, wherein size and position of the object representation are based at least in part on the feature points associated with the object representation.

6. The method of claim 1 wherein the computing environment is a video editing environment and wherein the video editing environment comprises:
   a viewing portion for displaying the video and the object representations;
   one or more editing tools for adding objects to the video and applying effects; and
   one or more timelines for:
      selecting one or more frames of the video; and
      displaying the use of one or more objects added to a video with respect to the time.

7. The method of claim 1 further comprising:
   receiving input specifying a new object whose movement is based at least in part on movement of an object representation during the video.

8. The method of claim 1 further comprising:
   segmenting out a well-defined object, wherein boundaries for the well-defined object more closely correspond to the boundaries of an actual video object than a rectangle defined by the outermost feature points of a sub-group of feature points corresponding to the actual video object.

9. The method of claim 8 wherein segmenting out a well-defined object comprises:
   using feature points of the sub-group in an image segmentation algorithm taking point input that is applied on a first frame of the video; and
   extrapolating boundaries that should be applied for the same object in subsequent frames of the video.

10. The method of claim 9 wherein segmenting out a well-defined object further comprises:
    generating input for the image segmentation algorithm for the subsequent frames of the video.

11. The method of claim 9 wherein segmenting out a well-defined object further comprises:
    replacing feature points with two dimensional areas to create a continuous marked region for the sub-group; and
    applying an erosion filter.

12. The method of claim 1 wherein using feature point location information to identify sub-groups of the feature points of one or more of the groups comprises:
    identifying a sub-group of feature points by identifying feature points which are all located within a minimum distance of at least one other feature point of the sub-group.

13. A computer apparatus comprising,
    a user interface for displaying a video and receiving input for editing the video;

an object analysis component for identifying motion paths of feature points within a video, using the motion paths to group feature points into groups, and using feature point location information to identify sub-groups of the feature points of one or more of the groups; and a display for presenting object representations associated with the sub-groups with the video, wherein instructions embodied in a computer-readable medium on the computer apparatus configure the computer apparatus to display the video and the object representations.

14. The computer apparatus of claim 13 wherein the user interface receives input specifying a new object whose movement is based at least in part on movement of an object representation during the video.

15. The computer apparatus of claim 13 wherein the user interface receives input specifying an effect to apply to an object representation during the video.

16. A computer-readable medium on which is encoded program code, the program code comprising:
   program code for identifying feature points within a video and identifying motion paths of the feature points within the video;
   program code for using the motion paths to group feature points into groups,
   program code for using feature point location information to identify sub-groups of the feature points of one or more of the groups; and
   program code for presenting object representations associated with the sub-groups with the video on a display of a computer apparatus, the computer apparatus comprising instructions embodied in a computer-readable medium which configure the computer apparatus to display the video and object representations.

* * * * *